(12) United States Patent
Lee et al.

(10) Patent No.: US 9,712,894 B2
(45) Date of Patent: Jul. 18, 2017

(54) PASSIVE WIRELESS SENSORS

(71) Applicant: General Electric Company, Schenectady, NY (US)

(72) Inventors: Yongjae Lee, Latham, NY (US); Joseph Alfred Iannotti, Niskayuna, NY (US); Nancy Cecelia Stoffel, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 261 days.

(21) Appl. No.: 14/264,074

(22) Filed: Apr. 29, 2014

(65) Prior Publication Data

US 2015/0312654 A1 Oct. 29, 2015

(51) Int. Cl.
| | |
|---|---|
| *G08C 19/22* | (2006.01) |
| *H04Q 9/00* | (2006.01) |
| *H01Q 1/22* | (2006.01) |
| *H04W 84/18* | (2009.01) |
| *H01Q 21/06* | (2006.01) |
| *H01Q 19/10* | (2006.01) |

(52) U.S. Cl.
CPC .......... *H04Q 9/00* (2013.01); *H01Q 1/2225* (2013.01); *H01Q 19/104* (2013.01); *H01Q 21/065* (2013.01); *H04W 84/18* (2013.01); *H04Q 2209/47* (2013.01)

(58) Field of Classification Search
CPC .. H01Q 19/104; H01Q 1/2225; H01Q 21/065; H04W 84/18; H04Q 2209/47; H04Q 9/00
USPC ................................... 340/870.07
See application file for complete search history.

(56) References Cited

U.S. PATENT DOCUMENTS

| | | | |
|---|---|---|---|
| 6,278,379 B1* | 8/2001 | Allen | ................. B60C 23/0408 324/655 |
| 6,667,725 B1* | 12/2003 | Simons | .................... H01Q 1/22 340/572.1 |
| 7,065,459 B2 | 6/2006 | Kalinin et al. | |
| 7,679,501 B2 | 3/2010 | Dixon et al. | |
| 8,104,358 B1 | 1/2012 | Jia et al. | |
| 8,296,087 B2 | 10/2012 | Kalinin et al. | |
| 2007/0074579 A1* | 4/2007 | Cook | .................... G01L 9/0072 73/718 |

(Continued)

FOREIGN PATENT DOCUMENTS

WO 9952722 A1 10/1999

OTHER PUBLICATIONS

Buff et al., "Passive remote sensing for temperature and pressure using SAW resonator devices", Ultrasonics, Ferroelectrics and Frequency Control, IEEE Transactions on, vol. 45, Issue 5, pp. 1388-1392, Sep. 1998.

(Continued)

*Primary Examiner* — Naomi Small
(74) *Attorney, Agent, or Firm* — John P. Darling

(57) ABSTRACT

A passive wireless sensor having a plurality of dielectric layers, an antenna, a diaphragm, and a feeding element is provided. Further, the antenna is disposed in at least a portion of a cavity formed by one or more dielectric layers of the plurality of dielectric layers. Moreover, the diaphragm is disposed on the cavity. Additionally, the feeding element is disposed in at least a portion of the plurality of dielectric layers. Also, the feeding element is operatively coupled to the antenna.

19 Claims, 13 Drawing Sheets

(56) References Cited

U.S. PATENT DOCUMENTS

| 2007/0090927 | A1* | 4/2007 | Potyrailo | G06K 19/0717 |
| --- | --- | --- | --- | --- |
| | | | | 340/10.41 |
| 2007/0171071 | A1* | 7/2007 | Chiu | H01Q 1/2208 |
| | | | | 340/572.7 |
| 2008/0143683 | A1* | 6/2008 | Hotelling | G06F 3/0416 |
| | | | | 345/173 |
| 2008/0143686 | A1* | 6/2008 | Yeh | B60K 37/06 |
| | | | | 345/173 |
| 2009/0007679 | A1 | 1/2009 | Nunez et al. | |
| 2009/0167503 | A1 | 7/2009 | Cook et al. | |
| 2010/0078753 | A1* | 4/2010 | Mehregany | G01F 1/6888 |
| | | | | 257/467 |
| 2011/0115497 | A1 | 5/2011 | Cros | |
| 2011/0280279 | A1 | 11/2011 | Gregory et al. | |
| 2012/0176609 | A1 | 7/2012 | Seppae et al. | |
| 2013/0332011 | A1* | 12/2013 | Ziarno | G05B 23/0213 |
| | | | | 701/3 |

OTHER PUBLICATIONS

Ong et al., "Design and application of a wireless, passive, resonant-circuit environmental monitoring sensor", Department of Electrical Engineering and Materials Research Institute, 204 Materials Research Laboratory, The Pennsylvania State University, University Park, PA 16802, USA, vol. 93, Issue 1, pp. 33-43, Aug. 25, 2001.

Ertugrul Berkcan et al., Title is Harsh Environment Sensor System and Detection Methods filed on Jul. 28, 2009, U.S. Appl. No. 12/510,302; 22 Pages.

GB Search Report and Examination Report issued in connection with corresponding GB Application No. 1506209.4 on Feb. 1, 2016.

\* cited by examiner

PASSIVE WIRELESS SENSORS

BACKGROUND

Embodiments of the present specification relate to sensors, and more particularly to wireless sensors.

Typically, harsh operating conditions may be present in an interior of an internal combustion engine or on a moving blade of a gas turbine. Non-limiting examples of these harsh operating conditions may include high operating temperatures, high operating pressures, dynamic motions, or combinations thereof. Generally, in operation, it is desirable to monitor one or more environmental parameters in devices and systems operating under the harsh operating conditions. These environmental parameters may include one or more of temperature, pressure, velocity, vibrations, acceleration, or humidity.

Gas turbine engines are examples of devices within which extremely harsh operating conditions may prevail. Further, the gas turbine engines may be used for various purposes, including propulsion and power generation, which typically experience the harsh operating conditions. A typical gas turbine engine includes rotating and non-rotating components, such as the compressor, combustor and turbine sections of the engine. Each of these components may operate in a different temperature range. For example, in the turbine section of a gas turbine engine, the turbine blades may be exposed to gases which may reach temperatures from about 1000° C. to about 2000° C. Due to concerns pertaining to corrosion, mechanical degradation, and thermal degradation it is desirable to monitor temperatures of components employed in the gas turbine engines and other devices operating under the harsh operating conditions.

Different techniques may be used to monitor a surface temperature of blades, vanes, combustors, discs, and the like. in the gas turbine engines. Non-limiting examples of these techniques may include wire thermocouples, thin film thermocouples, infrared photography, pyrometry (for example, three-dimensional pyrometry), thermo-graphic phosphors and thermal paints. A common technique used in the aircraft engine environment employs thermocouple wires embedded in the blade or vane wall. However, embedding wires in the walls may cause structural and aerodynamic complications, including perturbing the flow of air that is used to cool the blades and/or the vanes. This perturbation in the flow of air may affect a boundary layer of air present next to the blade or the vane and may adversely impact turbine performance. Further, another embedded thermocouple technique, employs plasma sprayed alumina ceramic coatings to encapsulate and insulate small diameter thermocouple wires on blades and vanes. However, due to the thermal mass of the wires and associated ceramic insulator layers, such devices may introduce measurement errors.

BRIEF DESCRIPTION

In accordance with aspects of the present specification, a passive wireless sensor includes a plurality of dielectric layers and an antenna disposed in at least a portion of a cavity formed by one or more dielectric layers of the plurality of dielectric layers. Further, the passive wireless sensor includes a diaphragm disposed on the cavity, and a feeding element disposed in at least a portion of the plurality of dielectric layers. Additionally, the feeding element is operatively coupled to the antenna.

In accordance with another aspect of the present specification, a monitoring system includes a device having a first surface and a passive wireless sensor disposed on the first surface of the device. The passive wireless sensor includes a plurality of dielectric layers and an antenna disposed in at least a portion of a cavity formed by one or more dielectric layers of the plurality of dielectric layers. Further, the passive wireless sensor includes a diaphragm disposed on the cavity, and a feeding element disposed in at least a portion of the plurality of dielectric layers. Moreover, the feeding element is operatively coupled to the antenna. Further, the monitoring system includes a transmitter configured to transmit interrogation signals and a receiver configured to receive at least a portion of response signals representative of a sensor response from the passive wireless sensor. Additionally, the monitoring system includes a signal processor operatively coupled to process the response signals, and a monitoring device configured to monitor the passive wireless sensor based on the processed response signals.

In accordance with yet another aspect of the present specification, a sensor network includes a transmitter configured to transmit interrogation signals. The sensor network further includes a plurality of sensing nodes, where one or more sensing nodes of the plurality of sensing nodes include at least one passive wireless sensor. Further, the at least one passive wireless sensor is configured to receive the interrogation signals and transmit response signals in response to the received interrogation signals. Moreover, the sensor network includes a receiver configured to receive the response signals, and a signal processor operatively coupled to the receiver to process the response signals to produce a sensor response.

DRAWINGS

These and other features, aspects, and advantages of the present disclosure will become better understood when the following detailed description is read with reference to the accompanying drawings in which like characters represent like parts throughout the drawings, wherein.

Figure 11:
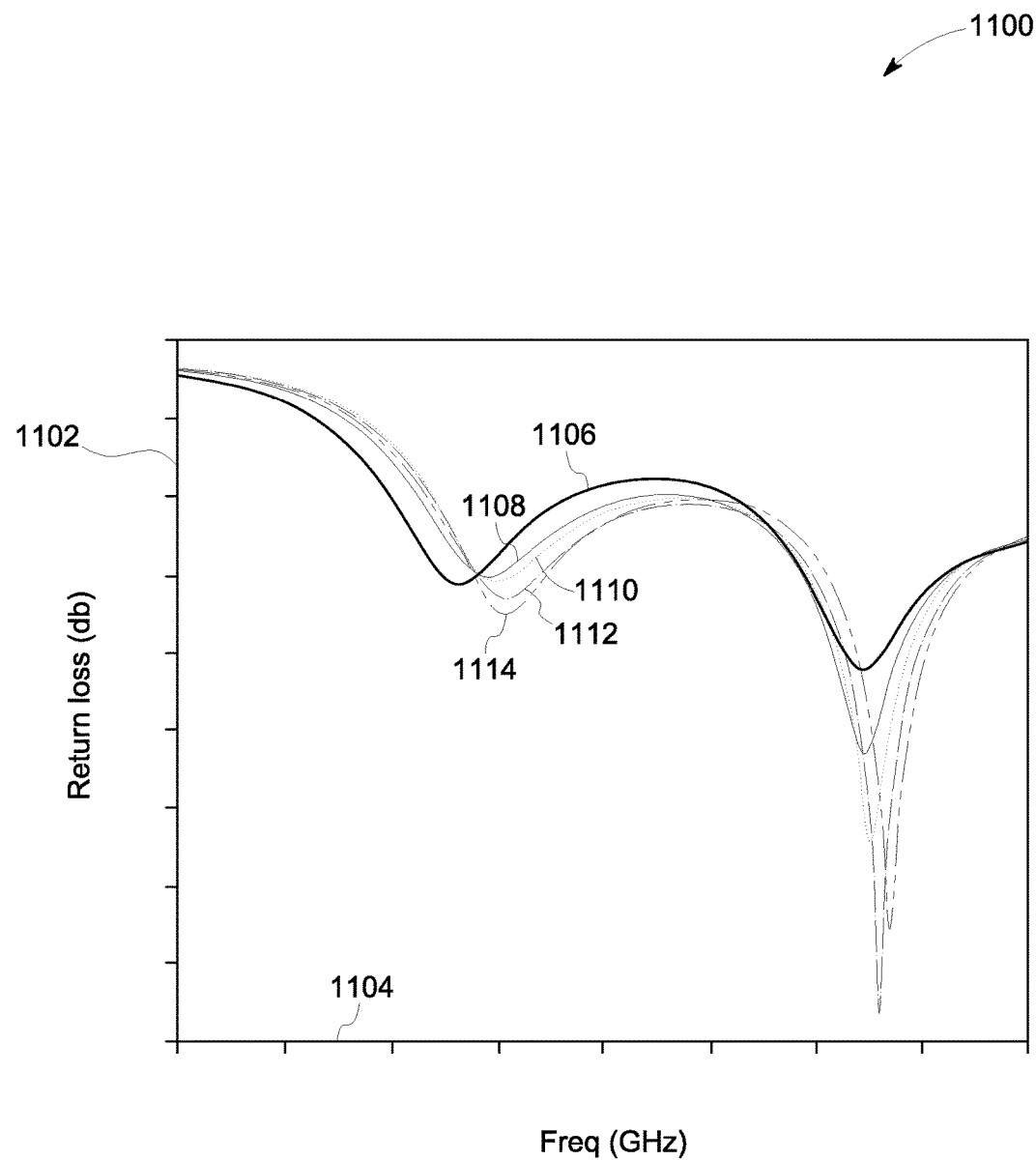
Figure 12:
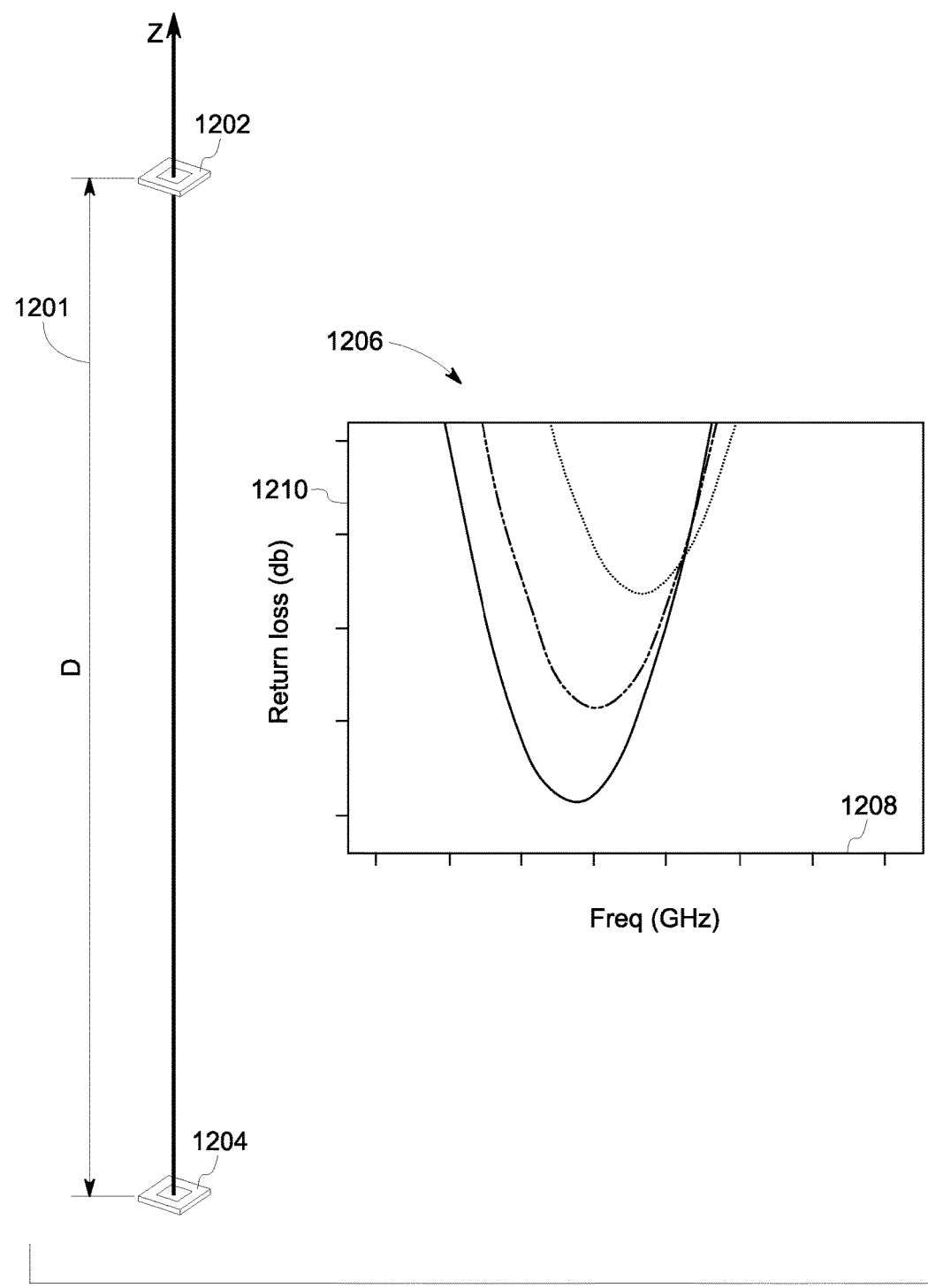
Figure 13:
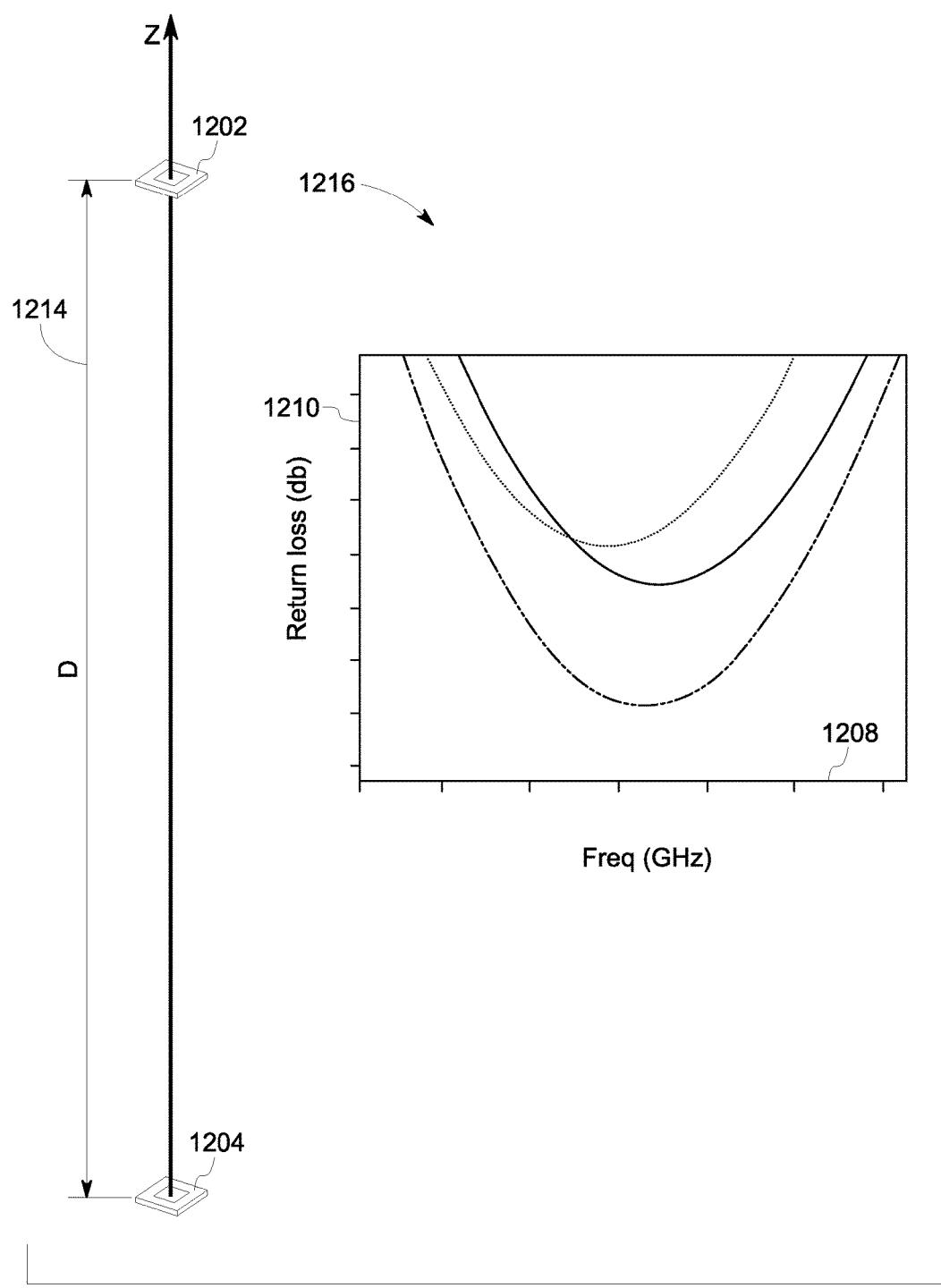

FIG. 11 is a graphical representation of a change in a sensor response in instances of mechanical disintegration of a diaphragm, in accordance with aspects of the present specification; and FIGS. 12-13 are graphical representations of a change in a sensor response with a change in a distance between an interrogator and a passive wireless sensor, in accordance with aspects of the present specification.

DETAILED DESCRIPTION

Embodiments of the present specification relate to passive wireless sensors configured to be operatively coupled to a device to sense one or more parameters of the device representative of a physical property, an ambient property, or both physical and ambient properties of the device. By way of example, the passive wireless sensor may be disposed on a turbine blade to sense a speed of rotation of the blade. The passive wireless sensor may also be disposed in an internal combustion engine to sense a temperature inside the internal combustion engine. Non-limiting examples of physical properties of the device may include temperature of the device, velocity of the device, speed of the device, acceleration of the device, vibrations of the device, or combinations thereof. It may be noted that the ambient property may be representative of an environment present within the device or the environment in which the device is disposed. Non-limiting examples of the ambient property of the device may include temperature, speed, pressure, acceleration, vibrations, or combinations thereof.

In certain embodiments, the passive wireless sensor may include a plurality of dielectric layers, an antenna disposed in at least a portion of a cavity formed by one or more dielectric layers of the plurality of dielectric layers. Further, the passive wireless sensor may include a diaphragm disposed in at least a portion of the cavity. Moreover, the passive wireless sensor may include a feeding element disposed in at least a portion of the plurality of dielectric layers. Additionally, the feeding element may be operatively coupled to the antenna. Also, the passive wireless sensor may include one or more impedance elements. Further, the impedance elements may be disposed on or in one or more dielectric layers of the plurality of dielectric layers.

Moreover, in certain embodiments, the passive wireless sensor may be configured to receive interrogation signals. The interrogation signals may be received by the feeding element of the passive wireless sensor. Further, the interrogation signals may be transferred to the antenna using the feeding element and one or more dielectric layers. Moreover, the passive wireless sensor may be configured to provide a sensor response in response to the received interrogation signals. By way of example, the passive wireless sensor may be configured to transmit the sensor response to a receiver or an interrogator when the passive wireless sensor receives the interrogation signals in the presence of one or more operating conditions of the device. Accordingly, the sensor response may be representative of the operating conditions of the device. In one embodiment, the sensor response may include signals transmitted by the antenna of the passive wireless sensor to a receiver. It may be noted that the receiver and the interrogator may be disposed outside the passive wireless sensor. Further, the receiver and the interrogator may be disposed outside the device in which the passive wireless sensor is disposed.

In certain embodiments, the interrogation signals may be lost when the diaphragm is deflected as a result of operating conditions in the device. In some embodiments, the loss of the interrogation signals may be proportional to an amount of deflection of the membrane. Hence, the loss of the interrogation signals may be representative of the operating conditions in the device. Further, a frequency of the response signals may decrease with increase in the loss of the interrogation signals. In particular, the frequency of the response signals may decrease with increase in the amount of deflection of the diaphragm. Hence, the frequency of the response signals may be representative of the operating conditions in the device.

Advantageously, the passive wireless sensors are configured to withstand harsh operating conditions, where the harsh operating conditions may be present within the device or outside the device. By way of example, in some embodiments, the passive wireless sensors may be configured to sense the parameters of the device under high temperature conditions, high pressure conditions, harsh chemical conditions (for example, caused due to presence of harsh chemical environments), or combinations thereof. In certain embodiments, the passive wireless sensors of the present specification may be suitable for use in an engine (for example, an internal combustion engine, or a jet engine), a reactor (for example, a nuclear reactor), a turbine (for example, gas turbine engine, a turbine blade), an industrial set-up for industrial applications, or combinations thereof. In one example, the passive wireless sensors may be employed to measure a temperature of one or more surfaces of rotating components and/or non-rotating components of a gas turbine engine.

Further, in non-limiting embodiments, the passive wireless sensors may be configured to operate at temperatures above 1000° C. Moreover, the passive wireless sensors may be configured to operate at such elevated temperatures for either short time periods (for example, less than an hour) or extended periods of time. Additionally, the passive wireless sensors may be configured to operate in environments where high temperatures, high gas velocities, and high acceleration loadings are encountered frequently and/or for extended periods of time. In one embodiment, the extended periods of time may be in a range from about few hours to about few months. Also, it may be noted that, while being configured to operate in harsh operating conditions, the passive wireless sensors of the present specification may not be limited to use in only harsh environments, and may be utilized for measuring relatively tolerant environmental conditions, such as, but not limited to, lower temperatures, lower pressures, lower velocities of gases, or combinations thereof.

Advantageously, the passive nature of the wireless sensors enables the passive wireless sensors to sense the parameters of the device without interfering or interacting with the device or a system employing the device in an undesirable manner. By way of example, dimensions of the passive wireless sensors may be such that the passive wireless sensors do not interfere with the rotation of a turbine blade. Further, as the name suggests, the passive wireless sensors are wireless devices that may be installed conveniently without the need to accommodate wires or cables that are otherwise associated with wired sensors.

In certain embodiments, one or more passive wireless sensors of the present specification may be employed in monitoring systems. As will be described in detail with respect to FIGS. 7-8 at least a portion of the monitoring systems may be wireless. In one example, the one or more passive wireless sensors may be employed in a monitoring system where one or more passive wireless sensors may communicate with one or more other passive wireless sensors or with one or more processors or monitoring devices used in the monitoring system. In one embodiment, the monitoring system may include a transmitter configured to transmit an interrogation signal, a passive wireless sensor configured to receive the interrogation signal and respond by transmitting a response signal. Further, the monitoring system may include a receiver for receiving the response signal. In one embodiment, the monitoring system may include an integrated processor for processing the response signal. Alternatively, the monitoring system may include a separate processor for processing the response signal. Additionally, the response signal may be analyzed or processed to sense one or more parameters representative of a physical property, an ambient property of the device. Further, the passive wireless sensors may be advantageously employed, for example, in a jet engine, as the passive wireless sensors do not require a power source. Further, the response signals from the passive wireless sensors may be accessed remotely. In a non-limiting example, the passive wireless sensor and the monitoring system may be used to monitor the safety and integrity of at least a portion of the jet engine.

Further, the passive wireless sensor may be useful in measuring the temperature on one or more surfaces of rotating and non-rotating components in gas turbine engines. In such environments, conventional wired sensors, such as wired thermocouples, may have relatively large thermal mass for reliable surface temperature measurement. Further, implementing the conventional wired sensors may provide additional challenges at least in terms of routing of the conventional wired sensors (for example, thermocouples) from a desired location on the device to a data acquisition system.

Advantageously, the passive wireless sensor of the present specification may be sufficiently thin so as to not significantly affect a boundary layer of a device to which the passive wireless sensor is operatively coupled. In one embodiment, a thickness of the passive wireless sensor may be in a range from about a few millimeters to about a few 100s of millimeters. In a particular example, the thickness of the passive wireless sensor may be in a range from about 10 millimeters to about 100 millimeters. In another example, the thickness of the passive wireless sensor may be in a range from about 20 millimeters to about 60 millimeters. However, while being thin enough to not interfere with the functioning of the device, the passive wireless sensor may be sufficiently robust to withstand the extreme thermal and mechanical environmental conditions encountered during operation of such devices. Further, the passive wireless sensor may have a small footprint, mechanical mass and robust mode of attachment, so as not to introduce undesirable vibrational modes in the device, such as a turbine blade. In a non-limiting example, a footprint of the passive wireless sensor may be in a range from about 10 mm×10 mm to about 100 mm×100 mm. Moreover, the passive wireless sensor may have a small thermal mass so as not to obstruct a surface temperature measurement. Additionally, the passive wireless sensor may be configured to rapidly respond to temperature changes, velocity changes, acceleration changes, pressure changes, or combinations thereof.

In certain embodiments, the passive wireless sensor may form part of a monitoring system. Further, in some embodiments, the passive wireless sensor may be employed in a sensor network having a plurality of sensing nodes. In these embodiments, the passive wireless sensor may be employed in one or more sensing nodes. Moreover, at least a portion of the sensor network may be configured to provide wireless communication between two or more nodes. Further, in one embodiment, at least a portion of the sensor network may be in wireless communication with an external device, such as a receiver, where the receiver is configured to receive response signals from the passive wireless sensor.

Figure 1:
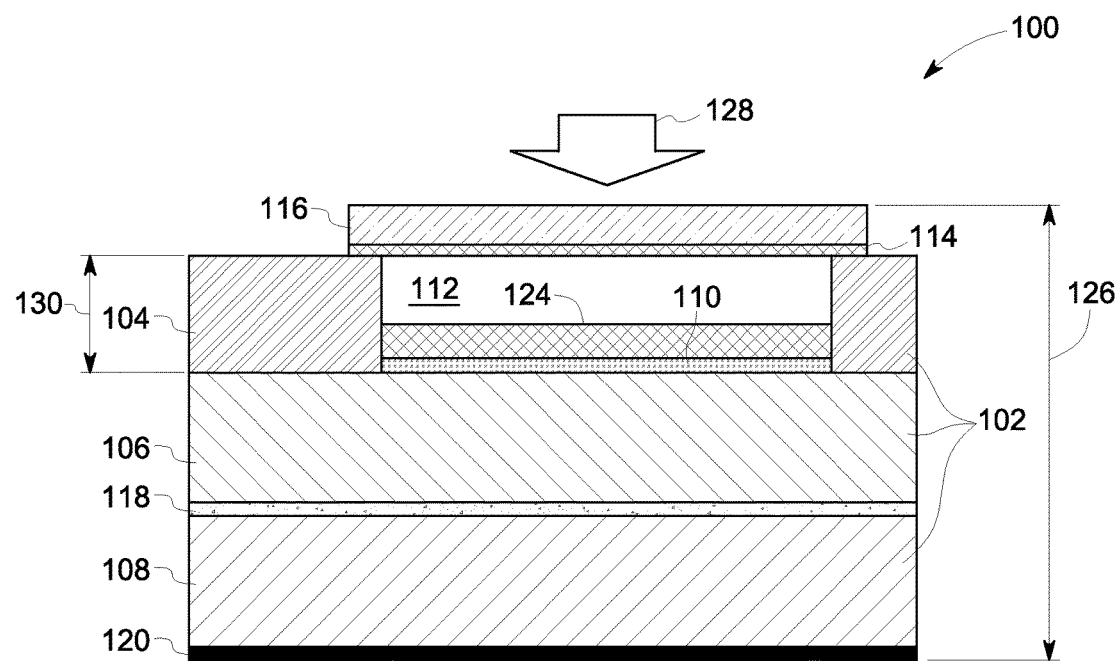
FIG. 1 is a cross-sectional view of an exemplary passive wireless sensor having a feeding element, in accordance with aspects of the present specification.

FIG. 1 illustrates an exemplary passive wireless sensor 100 of the present specification. As illustrated, the passive wireless sensor 100 may include a plurality of dielectric layers 102, an antenna 110 disposed in at least a portion of a cavity 112, a diaphragm 114, a protection layer 116, a feeding element 118 and a reference layer 120. The passive wireless sensor 100 further includes an antenna cover 124 disposed on at least a portion of the antenna 110. Further, a thickness 126 of the passive wireless sensor may be in a range from about 10 millimeters to about 100 millimeters. Moreover, the antenna 110 of the passive wireless sensor 100 is configured to receive interrogation signals, such as, but not limited to, radio frequency signals, emitted by a transmitter (not shown in FIG. 1) operatively coupled to the passive wireless sensor 100. Additionally, the antenna 110 may be configured to transmit signals representative of one or more environmental parameters in a device (not shown in FIG. 1) in which the passive wireless sensor 100 is disposed.

In the illustrated embodiment, the plurality of dielectric layers 102 is illustrated as having 3 individual dielectric layers 104, 106 and 108. However, in alternative embodiments, the plurality of dielectric layers 102 may include fewer or more dielectric layers. For example, the number of the dielectric layers 102 in the plurality of dielectric layers 102 may vary depending on the desirable features of the sensor 100, or on the physical or ambient property that the passive wireless sensor 100 is configured to sense. For example, in instances where the passive wireless sensor 100 is configured to sense a speed of rotation of a turbine blade, the thickness 126 of the passive wireless sensor 100 may be relatively lower. Consequently, in such instances, the passive wireless sensor 100 may have 1 or 2 layers in the plurality of dielectric layers 102.

Further, the dielectric layers 102 may be configured to withstand harsh operating conditions in an environment of a device, such as an internal combustion engine. By way of example, the plurality of dielectric layers 102 may be made of a material that has a relatively low value for a coefficient of thermal expansion. In a non-limiting example, the coefficient of thermal expansion may be up to about 10 ppm/° C.

Moreover, the dielectric material of the plurality of dielectric layers 102 may be configured to withstand high temperatures for an extended period of time. Non-limiting examples of such high temperature materials may include fused silica, engineered glass, silicon nitride, aluminum nitride, alumina, and high temperature ceramic composites (for example, yttria stabilized zirconia), or combinations thereof. Further, one or more dielectric layers 102 of the plurality of dielectric layers 102 may be made of a material that is different from a material of other dielectric layers 102 of the plurality of dielectric layers 102. For example, materials for the dielectric layers 102 may be selected such that values of a corresponding coefficient of thermal expansion gradually increases or decreases in a determined direction. In one example, the coefficient of thermal expansion of the dielectric layer 104 may be close to the coefficient of thermal expansion of a material of the antenna 110. In the same or different example, the coefficient of thermal expansion of the dielectric layer 108 may be closer in value to the dielectric constant of a material of the reference layer 120. In some embodiments, the material of the dielectric layers 102 may be selected to enhance the sensitivity of the passive wireless sensor 100. In one example, materials of the individual dielectric layers 104, 106 and 108 may be selected such that one or more dielectric layers 102 may be tuned for maximum response and sensitivity within a determined range of an environmental parameter. In some embodiments, the passive wireless sensor 100 may be configured to measure a temperature over a determined temperature range. In some of these embodiments, dielectric materials of one or more dielectric layers 102 may be more suitable for maximum response and sensitivity within that determined temperature range. Additionally, one or more dielectric layers 102 may be continuous layers. Alternatively or additionally, at least a portion of one or more dielectric layers 102 may include patterned structures. By way of example, as will be described in detail with respect to FIGS. 4-5, one or more dielectric layers 102 may include a plurality of columns.

Further, the cavity 112 may be formed in the dielectric layer 104 of the plurality of dielectric layers 102. Although in the illustrated embodiment, the cavity 112 is depicted as being disposed in a single dielectric layer 104, in alternative embodiments, the cavity 112 may be disposed in two or more dielectric layers 102. By way of example, the cavity 112 may be partly disposed in the dielectric layers 104 and 106. Additionally, as will be described in detail with respect to FIG. 6, in some instances the passive wireless sensor 100 may have more than one cavity 112. In these embodiments, the two or more cavities may each have a corresponding antenna. Further, each cavity 112 may be configured to sense a respective parameter.

Moreover, the diaphragm 114 may be disposed on the cavity 112 such that the diaphragm 114 is operatively coupled to the antenna 110 disposed in the cavity 112. Any physical change in the diaphragm 114 due to operating conditions present in the device may be reflected in the signals transmitted by the antenna 110. By way of example, in presence of a pressure (arrow 128) in the device, the diaphragm 114 may deflect towards the antenna 110, thereby altering the outgoing signals transmitted by the antenna 110 to an interrogator device (not shown in FIG. 1) disposed outside the passive wireless sensor 100, where the interrogator device is configured to receive the signal transmitted by the antenna 110 of the passive wireless sensor 100. This change in the transmitted signal of the antenna 110 may be representative of a value of the pressure present in the device where the passive wireless sensor 100 is employed. It may be noted that a height 130 of the cavity 112 may be suitable for accommodating the deflection of the diaphragm 114.

In certain embodiments, the diaphragm 114 may be thin enough to respond suitably in the presence of an operating condition, such that the response of the diaphragm 114 may be reflected in the signal transmitted by antenna 110, and where the change in the signal is processed by the interrogators or any other receivers configured to receive the signal from the antenna 110. Further, in some embodiments the diaphragm 112 may include a thin layer or membrane. The diaphragm 112 may be made of an electrically conductive material, such as a metal or a metal alloy.

Moreover, in one embodiment, the protection layer 116 may be disposed on the diaphragm 114. In some embodiments, the protection layer 116 may be configured to protect the diaphragm 114 from harsh operating conditions while enabling the diaphragm to perform its functions. In one example, the protection layer 116 may be configured to prevent oxidation of the diaphragm. Non-limiting examples of the material of the protection layer 116 may include silicon oxide, silicon nitride, alumina, aluminum nitride, spin on glass, high temperature ceramic composites (for example, yttria stabilized zirconia), or combinations thereof.

Further, in some embodiments, the antenna 110 may be a solid layer, or a patterned layer that includes joint or disjoint structures. In certain embodiments, the antenna 110 may include a continuous layer, a patterned layer, a plurality of patterned structures, or combinations thereof. In one embodiment, the antenna 110 may be a coil antenna or a patch antenna. The antenna 110 may be made of an electrically conductive material. Non-limiting examples of the material of the antenna 110 may include electrically conductive materials, such as, but not limited to, copper, aluminum, tungsten, molybdenum, tantalum, nickel, titanium, palladium, silver, platinum, gold, or alloys thereof, or combinations thereof. Further, the optional protective cover 124 disposed on at least a portion of the antenna 110 may be configured to protect the antenna 110 from the harsh operating conditions of the device. In one example, the protective cover 124 may be made of glass.

Further, the feeding element 118 is disposed in a portion of the plurality of dielectric layers 102. In the illustrated embodiment, the feeding element 118 is disposed between the dielectric layers 106 and 108. However, alternatively, the feeding element 118 may be disposed in a single dielectric layer 102. In another embodiment, the feeding element 118 may form one of the layers 102 of the passive wireless sensor 100. By way of example, in instances where a passive wireless sensor includes two dielectric layers, the feeding element may be disposed within one of the two dielectric layers. Further, the feeding element 118 is operatively coupled to the antenna 110 and configured to receive interrogation signals, such as, but not limited to, radio frequency signals and feed the received interrogation signals to the antenna 110 via the intermediate dielectric layers 102. In the embodiment of FIG. 1 the feeding element 118 is operatively coupled to the antenna 110 while not being in direct physical contact with the antenna 110. In an alternative embodiment, the feeding element 118 may be disposed between at least a portion of the dielectric layer 104 and at least a portion of the dielectric layer 106. In this embodiment, the feeding element 118 may be operatively coupled to the antenna 110, however, the feeding element may not be in direct physical contact with the antenna 110.

In one example, the reference layer 120 may be an electrically conductive layer. Further, the reference layer 120 may have a coefficient of thermal expansion that is suitable for a surface on which the passive wireless sensor 100 is disposed. The reference layer 120 is configured to facilitate integration of the passive wireless sensor 100 to an electrically conductive surface, such as a surface of a turbine blade.

The passive wireless sensor 100 further includes an impedance element (not shown in FIG. 1) disposed between the feeding element 118 and the reference layer 120. In one example, the impedance element may be disposed on a surface of the dielectric layer 108. In one embodiment, the impedance element may be a resistor, a capacitor, an inductor, or combinations thereof. Further, the impedance element may be integrated in the passive wireless sensor 100 by printing the impedance element on the surface of the dielectric layer 108. In operation, the diaphragm 114, the antenna 110, the impedance element and the reference layer 120 may form an electronic circuit. In particular, a capacitive coupling may take place between the antenna 110 and the reference layer 120 via the feeding element 118 and the impedance element. Further, in operation, deflection of the diaphragm 114 contributes at least in part to a change in signals reflected by the antenna 110 in response to the received interrogation signals. These response signals reflected by the antenna 110 may be referred to as a "sensor response" or "return loss."

In operation, radio frequency signals transmitted by a transmitter (not shown) are received by the feeding element 118. The signal received by the feeding element 118 may travel through intermediate dielectric layers 106 and 104 and may be received by the antenna 110. Due to presence of the operating conditions, such as, but not limited to, pressure and temperature, dielectric properties of the dielectric layers 102 may change. Further, the deflection of the diaphragm 114 may also change due to the presence of the operating conditions. These changes in the dielectric properties of the dielectric layers 102 and/or change in the deflection of the diaphragm 114 may alter the capacitive coupling between the antenna 110 and the reference layer 120, where the capacitive coupling takes place via the feeding element 118 and the impedance element. Accordingly, the operating conditions may alter the signal transmitted by the antenna, this signal transmitted by the antenna 110 is referred to as the sensor response of the passive wireless sensor. The change in the sensor response, such as shift in frequency of signals transmitted by the antenna 110, may be used to determine a parameter representative of the physical property or ambient property of the device.

Figure 2:
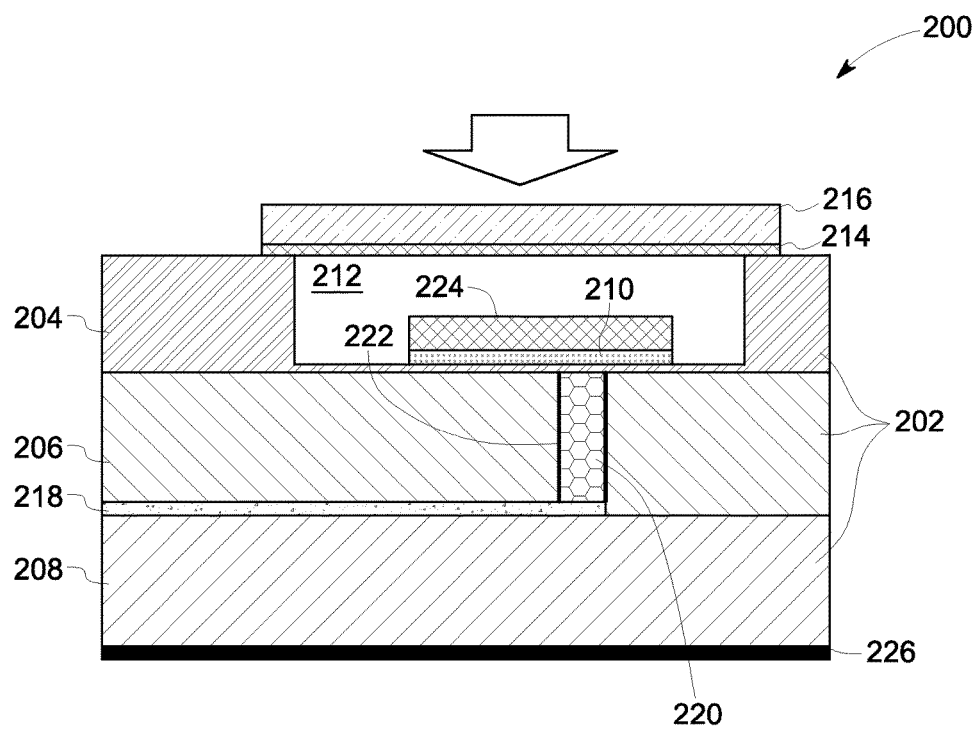
FIG. 2 is a cross-sectional view of an exemplary passive wireless sensor having a feeding via operatively coupled to a feeding element, in accordance with aspects of the present specification.
Figure 3:
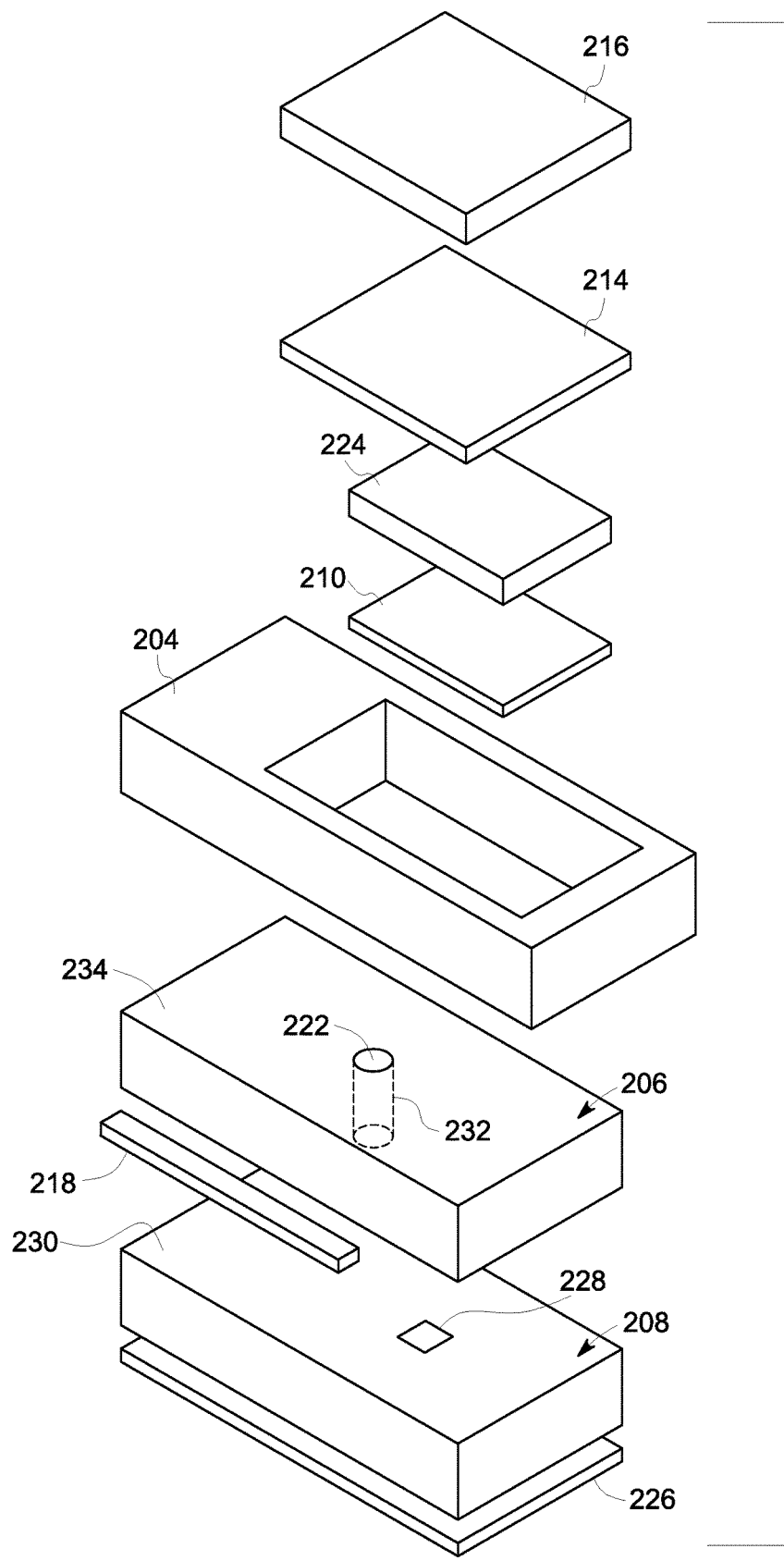
FIG. 3 is an exploded view of a portion of the passive wireless sensor of FIG. 2, in accordance with aspects of the present specification.

FIGS. 2-3 illustrate another exemplary passive wireless sensor 200 having a plurality of dielectric layers 202 with individual dielectric layers 204, 206 and 208. An antenna 210 is disposed in a cavity 212 formed in the dielectric layer 204. Further, the passive wireless sensor 200 includes a diaphragm 214 that is in operative association with the antenna 210. Further, a protection layer 216 may be disposed on the diaphragm 214. Moreover, in the illustrated embodiment, the passive wireless sensor 200 includes a feeding element 218. Additionally, the feeding element 218 is operatively coupled to the antenna 210 through a feeding via 220. The feeding via 220 may be configured to electrically couple the feeding element 218 to the antenna 210, while being physically disconnected to prevent short circuiting in the passive wireless sensor 200. In particular, a dielectric material of adjacent layers 204 or 206, or any other dielectric material may be disposed between the feeding via 220 and the antenna 210 to prevent short circuiting of the feeding via 220 and the antenna 210. The feeding via 220 may be made by providing a hole 222 between the feeding element 218 and the antenna 210. The hole 222 may be filled with an electrically conductive material that is suitable to transmit a first radio frequency signal from the feeding element 218 to the antenna 210. Further, the hole 222 may be such that at least a portion of the feeding element 218 is in direct physical contact with at least a portion of the feeding via 220.

Further, the passive wireless sensor 200 may also include an antenna cover 224, where the antenna cover 224 is disposed on at least a portion of the antenna 210. As discussed with respect to FIG. 1, the antenna cover 224 is configured to protect the antenna 210 from undesirable oxidation or other chemical reactions, or mechanical disintegration during operation of the device.

In operation, the feeding element 218 may receive the first radio frequency signal and transmit the received radio frequency signal to the antenna 210 using the feeding via 220. In one example, the feeding element 218 and the feeding via 220 may be made of the same or similar material. However, in another example, the feeding element 218 and the feeding via 220 may be made of different materials. By way of example, the materials of the feeding element 218 and the feeding via 220 may be different to provide enhanced match of coefficients of thermals expansion of the feeding element 218 and/or the feeding via 220 with neighboring dielectric layers 202.

Advantageously, the effect of temperature on sensor response may be compensated at least in part by the use of the feeding via 220. By way of example, as the radio frequency signals received by the feeding element 218 are passed through the feeding via 220 to be received by the antenna 210 the change in dielectric properties of the dielectric layers 202 caused due to change in temperature does not affect the transmitted signals. In one embodiment, the feeding via 220 may be used in the passive wireless sensor 200 for sensing pressure.

Further, as illustrated in an exploded view of FIG. 3, the passive wireless sensor may further include an impedance element 228 disposed on at least a portion of a surface 230 of the dielectric layer 208. Alternatively, the impedance element 228 may be disposed within the dielectric layer 208. Moreover, although not illustrated, in some embodiments, the passive wireless sensor, such as the passive wireless sensor 200, may employ two or more impedance elements, where the two or more impedance elements may be disposed in different locations on or in the dielectric layer 208.

Moreover, as illustrated in FIG. 3, the antenna 210 may include a patch antenna. Reference numeral 232 represents a location of the feeding via 220 on a surface 234 of the dielectric layer 206. Further, the passive wireless sensor 200 may include a reference layer 226. The reference layer 226 may include an electrically conductive material. Further, the electrically conductive material of the reference layer 226 may have a suitable coefficient of thermal expansion to enable installing the passive wireless sensor 200 in a device or on a device. In operation, the reference layer 226 may be configured to provide capacitive coupling between the antenna 210 and the reference layer 226 via the feeding element 218, the feeding via 220 and the impedance element 228. In one example, the feeding via 220 may additionally be connected to the reference layer 226 to provide grounding to the feeding via 220 and to further reduce the parasitic element of the passive wireless sensor 200.

Figure 4:
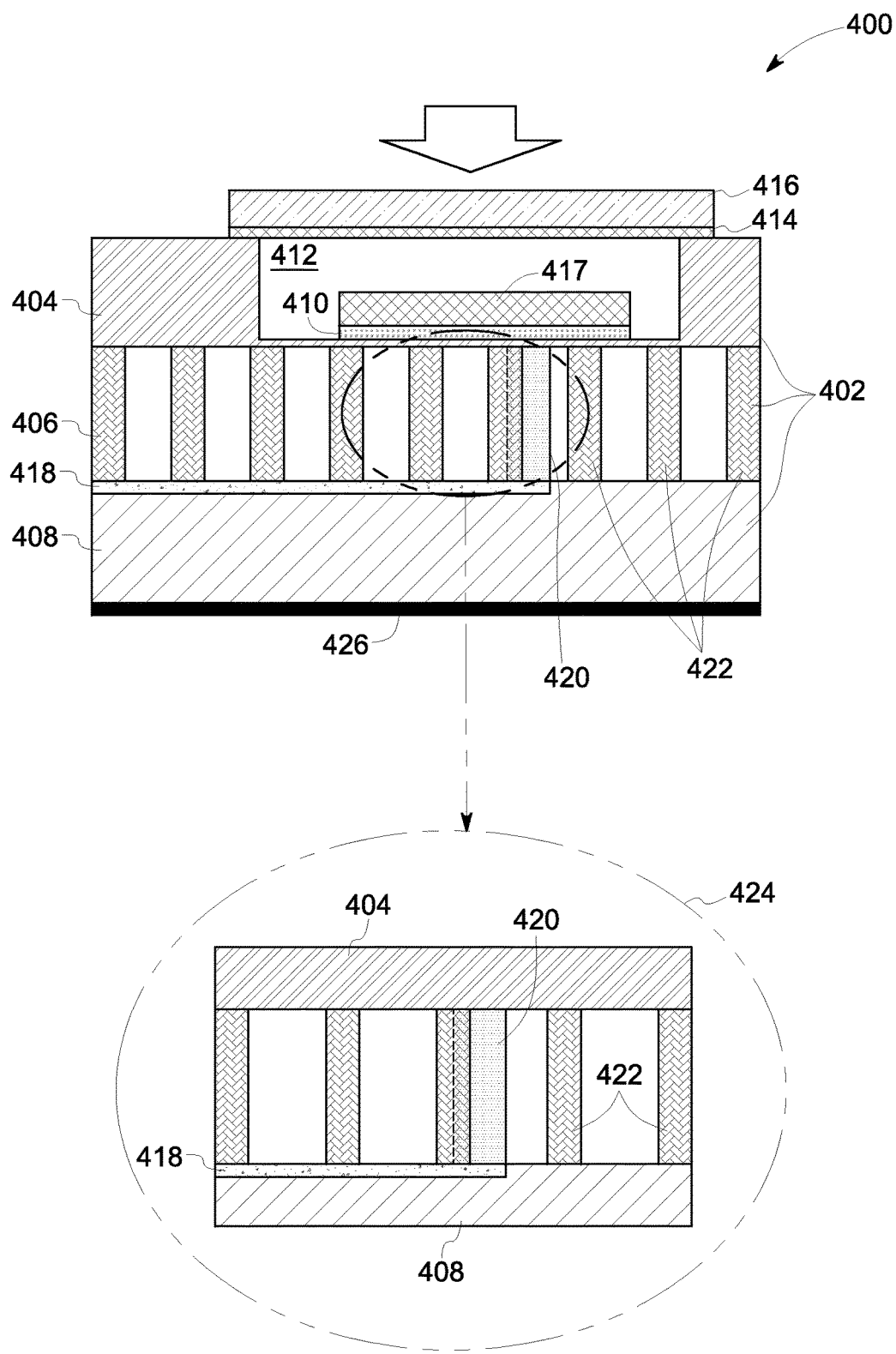
FIG. 4 is a cross-sectional view of an exemplary passive wireless sensor having a plurality of columns operatively coupled to an antenna, in accordance with aspects of the present specification.
Figure 5:
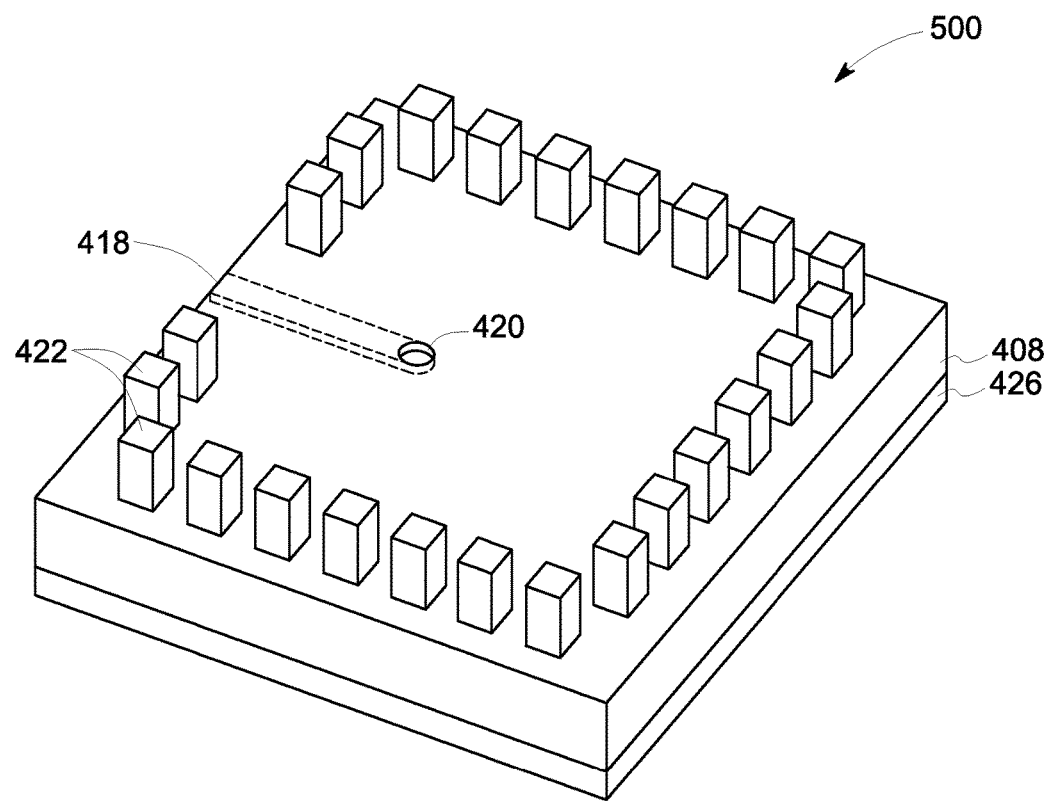
FIG. 5 is a perspective view of a portion of the passive wireless sensor of FIG. 4, in accordance with aspects of the present specification.

FIG. 4 is another example of a passive wireless sensor 400 of the present specification. FIG. 5 illustrates a perspective view 500 of a portion of the passive wireless sensor 400 of FIG. 4. In the illustrated embodiments of FIGS. 4-5, the passive wireless sensor 400 includes a plurality of dielectric layers 402 having individual layers 404, 406 and 408. Further, the passive wireless sensor 400 includes an antenna 410 disposed in a cavity 412 formed in the dielectric layer 404. Further, the passive wireless sensor 400 includes a diaphragm 414 operatively coupled to the antenna 410. Moreover, a protection layer 416 is disposed on the diaphragm 414. Additionally, an antenna cover 417 may be disposed on at least a portion of the antenna 410.

The passive wireless sensor 400 further includes a feeding element 418 physically coupled to the antenna 410 using a feeding via 420. The feeding via 420 is disposed in the dielectric layer 406, where the dielectric layer 406 is a patterned dielectric layer. In particular, the dielectric layer 406 may include a plurality of columns 422 such that one or more columns 422 of the plurality of columns 422 may extend between at least a portion of the neighboring dielectric layers 404 and 408. Further, in the illustrated embodiment, the columns 422 of the plurality of columns 422 are shown as physically disjoint structures, however, in some embodiments, the columns may originate from a common base. As illustrated in an enlarged view 424, in some embodiments, the feeding via 420 may be disposed between two or more columns 422.

Advantageously, having disjoint portions of the dielectric layer 406, and in particular, the plurality of columns 412 may provide enhanced coupling between the antenna 410 and a reference layer 426, thereby increasing the capacitive coupling between the antenna 410 and the reference layer 426. Further, increased capacitive coupling between the antenna 410 and the reference layer 426 may result in a shift in a frequency of the sensor response towards the higher frequencies. Accordingly, for a similar frequency range of a sensor response, a relatively smaller size of a passive wireless sensor may be used, where the passive wireless sensor includes a plurality of columns in at least a portion of a dielectric layer of the plurality of dielectric layers of the passive wireless sensor.

Figure 6:
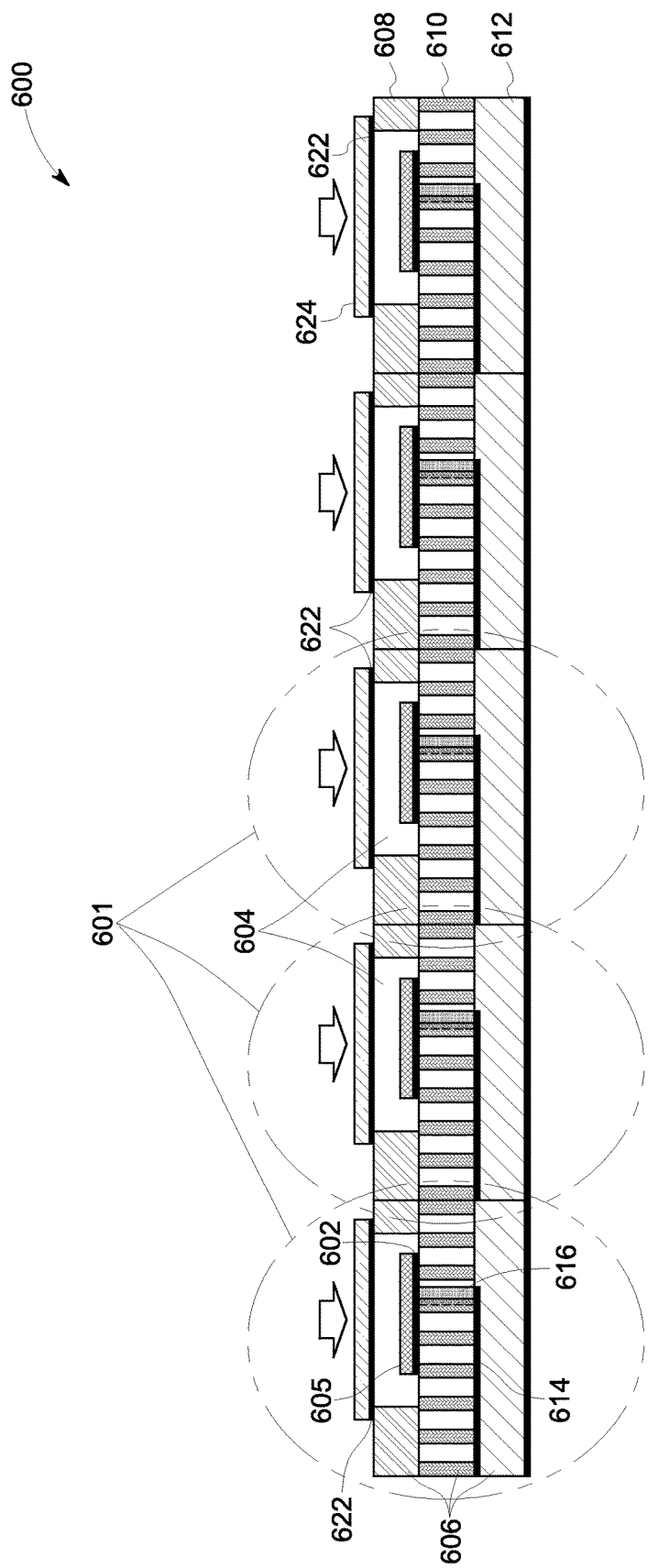
FIG. 6 is a cross-sectional view of an exemplary passive wireless sensor assembly having a plurality of passive wireless sensing regions, in accordance with aspects of the present specification.

FIG. 6 is a cross-sectional view of a passive wireless sensor assembly 600 having a plurality of passive wireless sensing regions 601, where each region 601 of the plurality of passive wireless sensing regions 601 is configured to function independent of other regions 601. In some embodiments, each individual section 601 of the passive wireless sensor 600 may be configured to sense a parameter independent of other sections 601. By way of example, one of the sections 601 may be configured to sense a temperature of a device (not shown), whereas another section 601 may be configured to sense a pressure of the device. Further, it may be noted that the sections 601 need not be disposed side by side. In one example, the sections 601 may be disposed in a random order on a dielectric layer 606 of a plurality of dielectric layers 606.

Further, the passive wireless sensor assembly 600 may employ a plurality of antennae 602, where each antenna 602 of the plurality of antennae 602 is disposed in a corresponding cavity 604 of a plurality of cavities 604. One or more antennae 602 of the plurality of antennae 602 may be different from other antennae 602. By way of example, a shape of one or more antennae 602 may be different from a shape of the other antennae 602, or a material of one or more antennae 602 may be different from a material of the other antennae 602 based on parameters that the respective passive wireless section 601 is configured to sense. Moreover, one or more dimensions of a cavity 604 of the plurality of cavities 604 may be same or different from the dimensions of other cavities 604. By way of example, a height of the cavities 604 may be the same or different. Further, one or more antennae 602 may include an antenna cover 605 disposed on at least a portion of the antenna 602.

Additionally, the passive wireless sensor assembly 600 includes a plurality of dielectric layers 606. In the illustrated embodiment, the plurality of dielectric layers 606 includes individual dielectric layers 608, 610 and 612. Further, a plurality of feeding elements 614 may be disposed in at least a portion of the passive wireless sensor assembly 600. In the illustrated embodiment, a plurality of feeding vias 616 may be coupled to some of the antennae 602. However, although not illustrated, in an alternative embodiment, the feeding vias 616 may be coupled to each of the antennae 602 of the plurality of antennae 602. Moreover, in certain embodiments, the passive wireless sensor assembly 600 may further include a plurality of diaphragms 622 and a plurality of protection layers 624. Further, each protection layer 624 is disposed on a corresponding diaphragm 622.

In one embodiment, the plurality of passive wireless sensor sections 601 of the passive wireless sensor assembly 600 may operate simultaneously. In another embodiment, the plurality of passive wireless sensor sections 601 may be configured to operate at different times.

Figure 7:
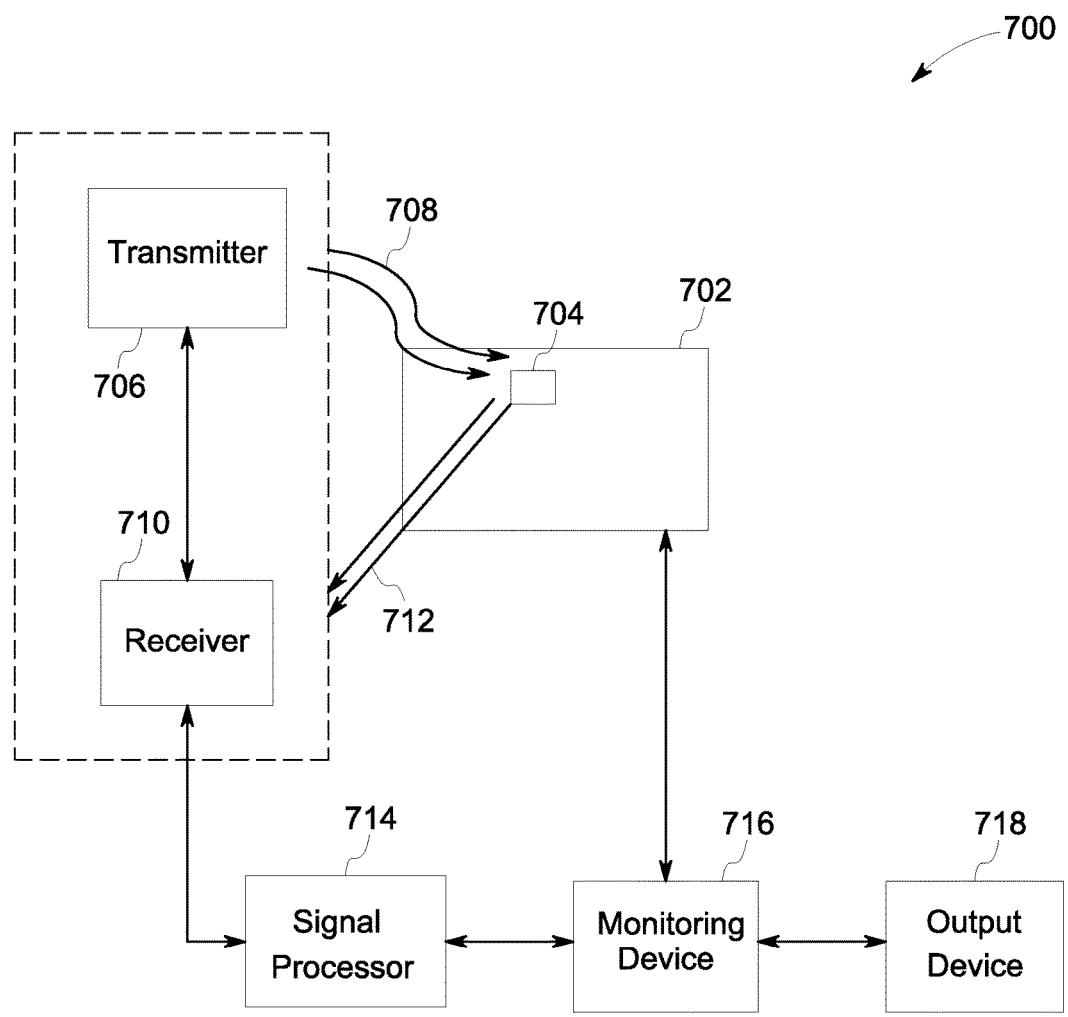
FIG. 7 is a schematic representation of a monitoring system configured to monitor one or more operating conditions in a device using a passive wireless sensor, in accordance with aspects of the present specification.

FIG. 7 is a schematic representation of a monitoring system 700 configured to monitor one or more operating conditions in a device 702 using one or more passive wireless sensors, such as a passive wireless sensor 704, in accordance with aspects of the present specification. In one embodiment, the passive wireless sensor 704 may be disposed inside of the device 702. By way of example, the passive wireless sensor 704 may be physically coupled to a surface of an internal combustion engine. In another embodiment, the passive wireless sensor 704 may be disposed on a surface of the device 702. By way of example, the passive wireless sensor 704 may be disposed on a surface of a turbine blade. Non-limiting examples of the methods of physically coupling the passive wireless sensor to a surface include chemical adhesion, physical adhesion, metal abrasion, bolting, soldering, laser assisted methods for adhesion, or combinations thereof. Non-limited examples of materials used for adhesion methods may include nano-silver adhesives, nano-copper adhesives, glass fits, or combinations thereof. In one embodiment, the passive wireless sensor 700 may be coupled to the device 702 using a ceramic based adhesive. Advantageously, the ceramic based adhesives may be configured to withstand high temperatures.

Further, the monitoring system 700 may include a transmitter 706 operatively coupled to the passive wireless sensor 704. In operation, the transmitter 706 is configured to transmit desirable radio frequency signals 708 to the passive wireless sensor 704.

Moreover, the monitoring system 700 may include a receiver or an interrogator 710 configured to receive signals 712 reflected by an antenna of the passive wireless sensor 704. In operation, a diaphragm of the passive wireless sensor 704 may deflect due to presence of one or more operating conditions. By way of example, presence of a high temperature, high pressure, movement (velocity/acceleration) of gases, may deflect the diaphragm. Further, deflection of the diaphragm and/or a change in dielectric properties of a plurality of dielectric layers of the passive wireless sensor 704 may influence the signals 712 reflected by the antenna of the passive wireless sensor 704. Further, the change in the deflection of the diaphragm and/or the change in the dielectric properties of one or more dielectric layers of the plurality of dielectric layers may result in a change in capacitive coupling between the antenna and a reference layer of the passive wireless sensor 704. In addition, this change in the capacitive coupling between the antenna and the reference layer may alter the sensor response. Hence, the signals reflected by the antenna may be processed to measure one or more physical or ambient properties of the device 704.

In some embodiments, the transmitter 706 and the receiver 710 may be present as separate physical entities, whereas, in some other embodiments, the transmitter 706 and the receiver 710 may be integrated to form a transceiver or an interrogator that is configured to transmit interrogation signals as well as receive response signals from the antenna of the passive wireless sensor 704. Further, the response signals 712 may be processed by the receiver 710 or may be processed by a signal processor 714 to produce a sensor response. The sensor response may be used to determine one or more physical or ambient properties of the device 704. In one embodiment, deflection of the diaphragm may be correlated to response signals 712, and the response signals in turn may be correlated to the physical, chemical or biological parameters of the environment.

In certain embodiments, the signal processor 714, for example, may include one or more application-specific processors, graphical processing units (GPUs), digital signal processors (DSPs), microcomputers, microcontrollers, Application Specific Integrated Circuits (ASICs) and/or Field Programmable Gate Arrays (FPGAs).

Further, the monitoring system 700 may include a monitoring device 716 that is operatively coupled to the device 702. The signal processor 714 may communicate the data representative of the environmental parameters to the monitoring device 716. In one embodiment, the signal processor 714 may be configured to analyze the data. The monitoring device 716 may be configured to monitor the operation of the device 702 in accordance with the data analyzed by the signal processor 714. Although shown as two separate blocks, in some embodiments the signal processor and monitoring device may be integrated in a single unit.

In one embodiment, the signal processor 714 and/or the monitoring device 716 may be disposed in a location that is local to the location of the device 702. Alternatively, or additionally, the signal processor 714 and/or the monitoring device 716 may be located in a remote location with reference to the device 702. Further, the signal processor 714 and/or the monitoring device 716 may be configured to store processed data in a storage repository (not shown). Non-limiting examples of the storage repository may include devices such as a hard disk drive, a floppy disk drive, a compact disk-read/write (CD-R/W) drive, a Digital Versatile Disc (DVD) drive, a flash drive, and/or a solid-state storage device.

Further, the signal processor 714 and/or the monitoring device 716 may be operatively coupled to an output device 718 to enable a user or an operator to manually monitor the system 700, or to enable a user to gain information regarding the system 700 at a given point in time. To that end, the output device 718, for example, may include a display device, a printer, and/or an audio output device.

In one embodiment, the monitoring system 700 may be configured to perform continuous monitoring during the duration of operation of the device 702. Further, the monitoring system 700 may be configured to perform real-time monitoring of the device 702. Moreover, the monitoring system 700 is configured to monitor one or more parameters (physical parameters or environmental parameters) of the device 702.

In one embodiment, the transmitter 706 may include a signal generator (not shown), an up-converter (not shown), an antenna (not shown), and a signal amplifier (not shown). Further, in this embodiment, the receiver 710 may include an antenna (not shown) and a down-converter (not shown). In operation, the signal generator of the transmitter 706 generates an interrogation signal that is up-converted by the up-converter to a frequency in a range corresponding to a resonant frequency of the passive wireless sensor 704. Depending upon the specific dimensions of the passive wireless sensor 704 and materials of the passive wireless sensor 704, the up-converted interrogation signals may be in a range from about 100 kHz to about 10 GHz. The up-converted interrogation signals may be amplified by the amplifier and supplied to the antenna of the transmitter 706 for transmission to the passive wireless sensor 704. It may be noted that the transmitter 706 and the receiver 710 may be housed in a single or multiple enclosures.

Further, the response signals 712 may be received by the receiver 710 via the antenna of the receiver 710. The response signals 712 may be down-converted using the down-converter. Further, if the signal processor 714 is part of the receiver 710, the response signals 712 may be analyzed by the signal processor 714 to generate an environmental parameter value. In one embodiment, the signal processor 714 may include a specially-programmed general purpose computer or application specific integrated circuit and processor.

Figure 8:
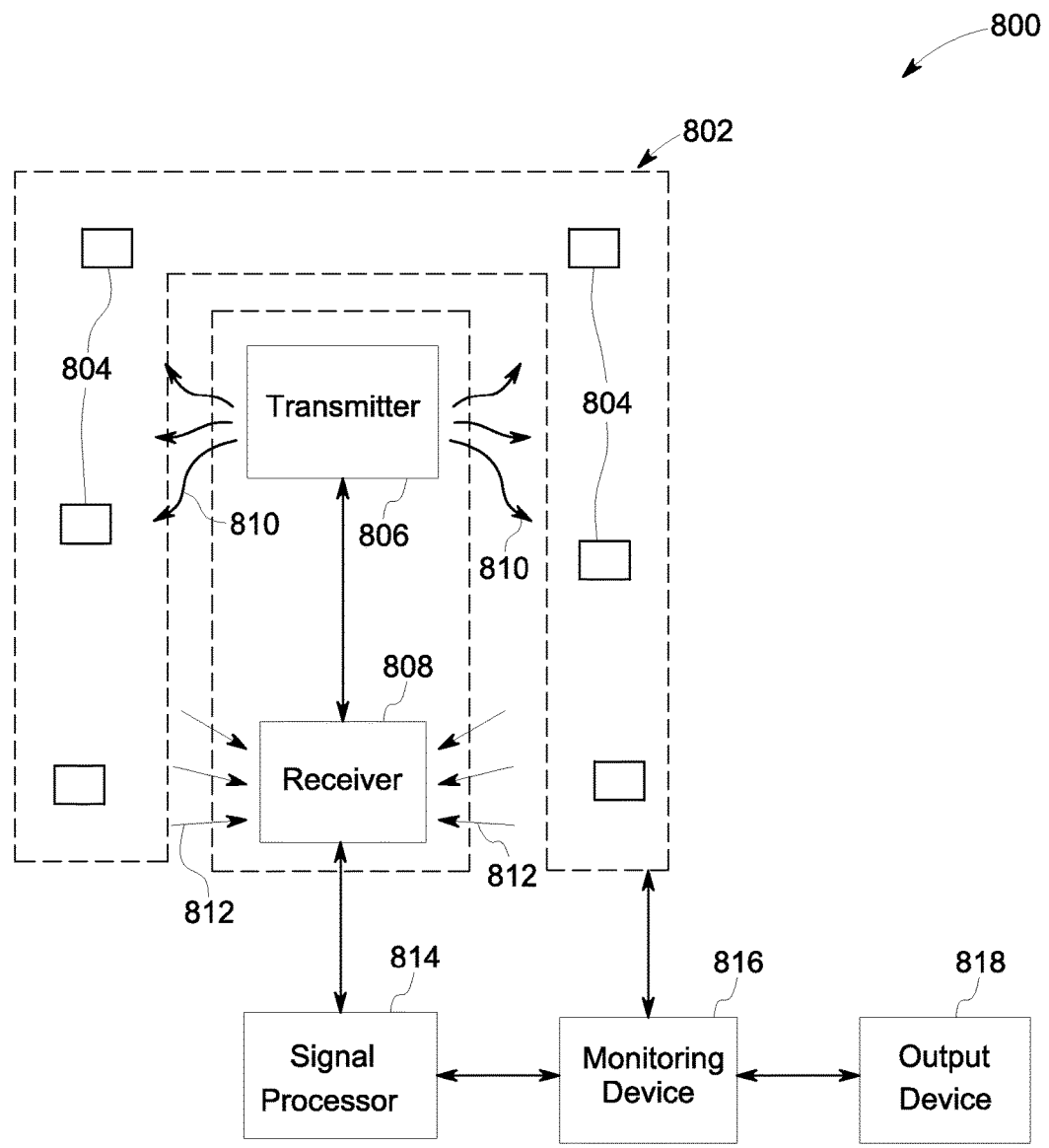
FIG. 8 is a schematic representation of a sensor network having a plurality of sensing nodes, where one or more sensing nodes of the plurality of sensing nodes include a passive wireless sensor, in accordance with aspects of the present specification.

FIG. 8 is a schematic representation of an exemplary monitoring system 800 employing a sensor network 802 having a plurality of sensing nodes 804. Further, one or more sensing nodes 804 of the plurality of sensing nodes 804 may include a passive wireless sensor, in accordance with aspects of the present specification.

The sensor network 802 having the sensing nodes 804 may be employed in a device, such as, but not limited to, a turbine blade, turbine engine, internal combustion engine, a reactor, or combinations thereof. By way of example, in case of a turbine, some of the sensing nodes 804 may be operatively coupled to a turbine engine, while some other sensing nodes 804 may be disposed on a turbine blade.

In one embodiment, each sensing node 804 of the plurality of sensing nodes 804 may include a passive wireless sensor of the present specification. Further, various sensing nodes 804 may be configured to measure the same or different parameters. In one example where each sensing node 804 is a passive wireless sensor, the passive wireless sensor may be configured to measure a temperature at different locations in an internal combustion engine. In another example, one or more passive wireless sensors may be configured to measure a temperature at various locations in the device. Further, some other passive wireless sensors may be configured to measure a pressure at one or more locations in the device, while one or more other passive wireless sensors may be configured to sense a speed of rotation of the device.

In some embodiments, one or more sensing nodes 804 may be configured to wirelessly communicate with each other and with a transmitter 806 and a receiver 808. By way of example, the sensing nodes 804 may be configured to receive transmitted signals 810 from the transmitter 806. Further, the receiver 808 may be configured to receive response signals 812 from the sensing nodes 804.

The monitoring system 800 may further include a signal processor 814, a monitoring device 816, and an output device 818. Advantageously, the monitoring system 800 is configured for continuous monitoring, real-time monitoring, on demand monitoring, or combinations thereof, or one or more devices.

Figure 9:
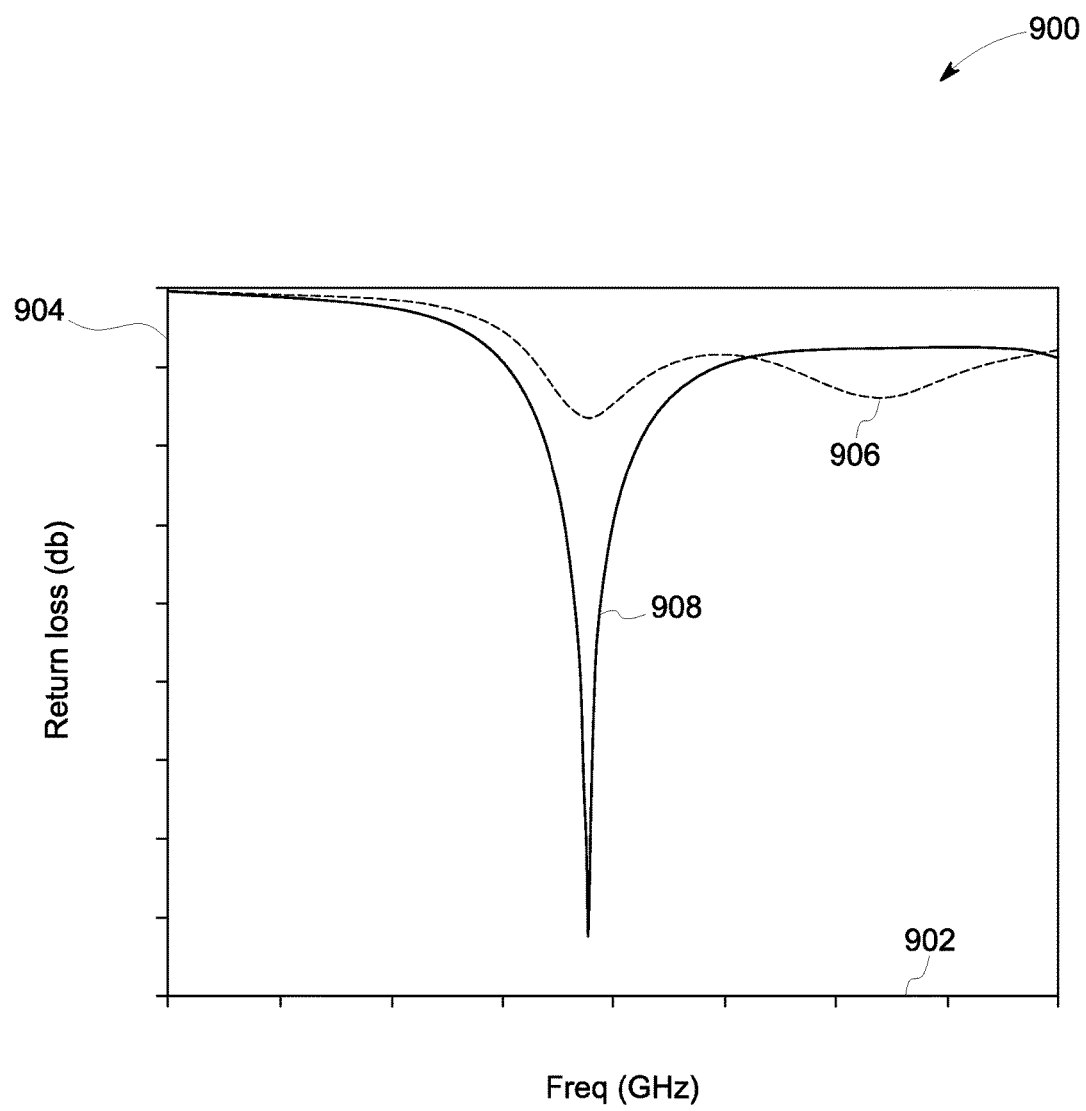
FIG. 9 is a graphical representation of a change in sensor response with a change in a size of the sensor, in accordance with aspects of the present specification.

FIG. 9 is a graphical representation 900 of a sensor response obtained from a first passive wireless sensor which does not include a feeding via and a second passive wireless sensor that has a feeding via. Further, the first passive wireless sensor may have a footprint of about 60 mm×60 mm and the second passive wireless sensor may have a footprint of about 25 mm×25 mm. Abscissa 902 represents frequency of a response signal from a passive wireless sensor and ordinate 904 represents magnitude of the sensor response. Graph 906 represents a sensor response from the first passive wireless sensor that does not have the feeding via. Further, graph 908 represents a sensor response from the second passive wireless sensor that has the feeding via. The magnitude of the sensor response 906 is lower than a magnitude of the sensor response 908. Further, the sensor response 908 is at a higher frequency as compared to the sensor response 906. Accordingly, the use of feeding via may be used in applications where it is desirable to reduce the size of the sensor, while maintaining or even increasing the sensor response. Advantageously, the use of the feeding via provides enhanced capacitive coupling between an antenna and a reference layer of the second passive wireless sensor, thereby increasing the frequency of the sensor response.

Figure 10A:
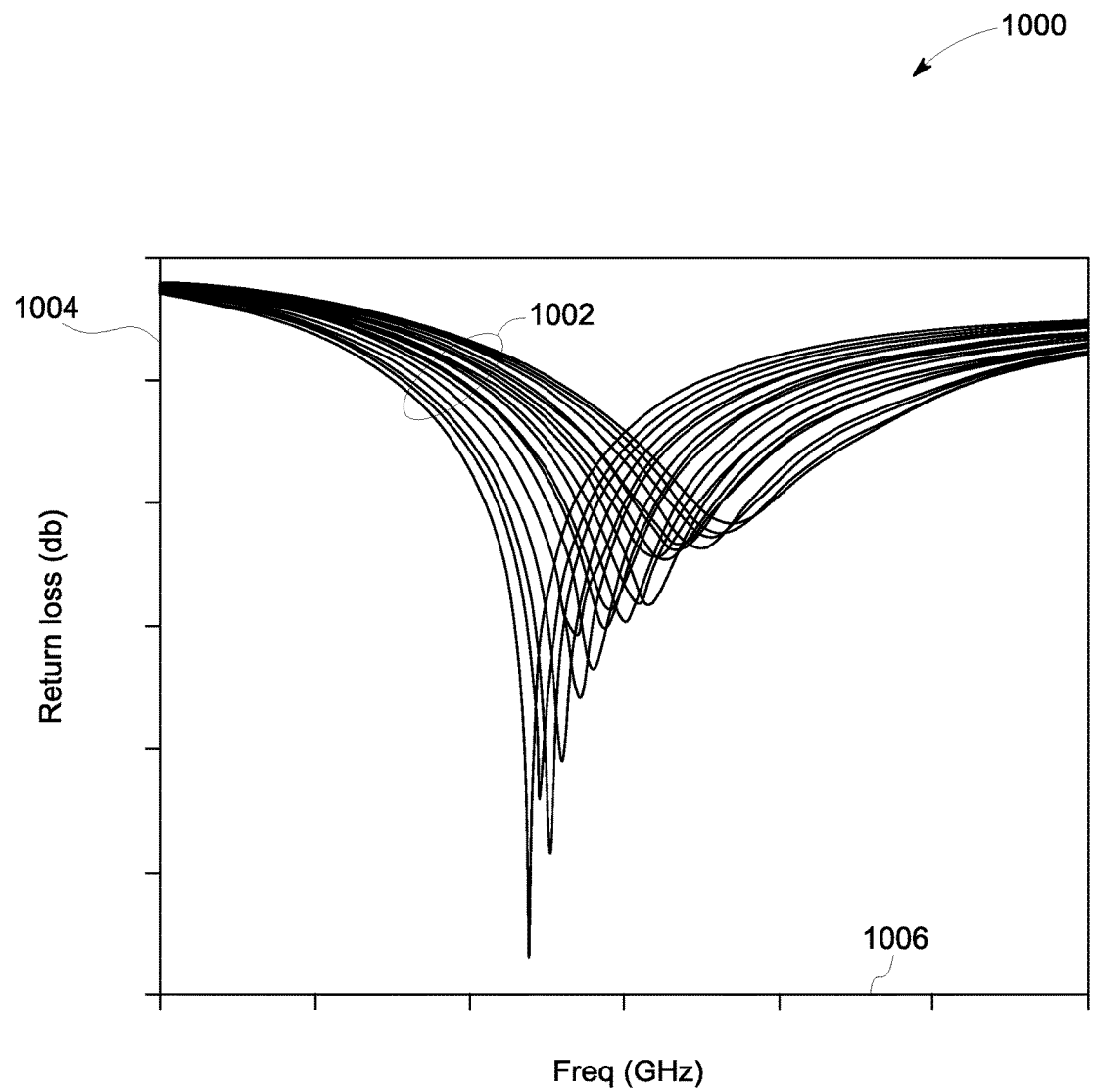
FIG. 10A is a graphical representation of a change in a sensor response with varying deflection values of a diaphragm, in accordance with aspects of the present specification.
Figure 10B:
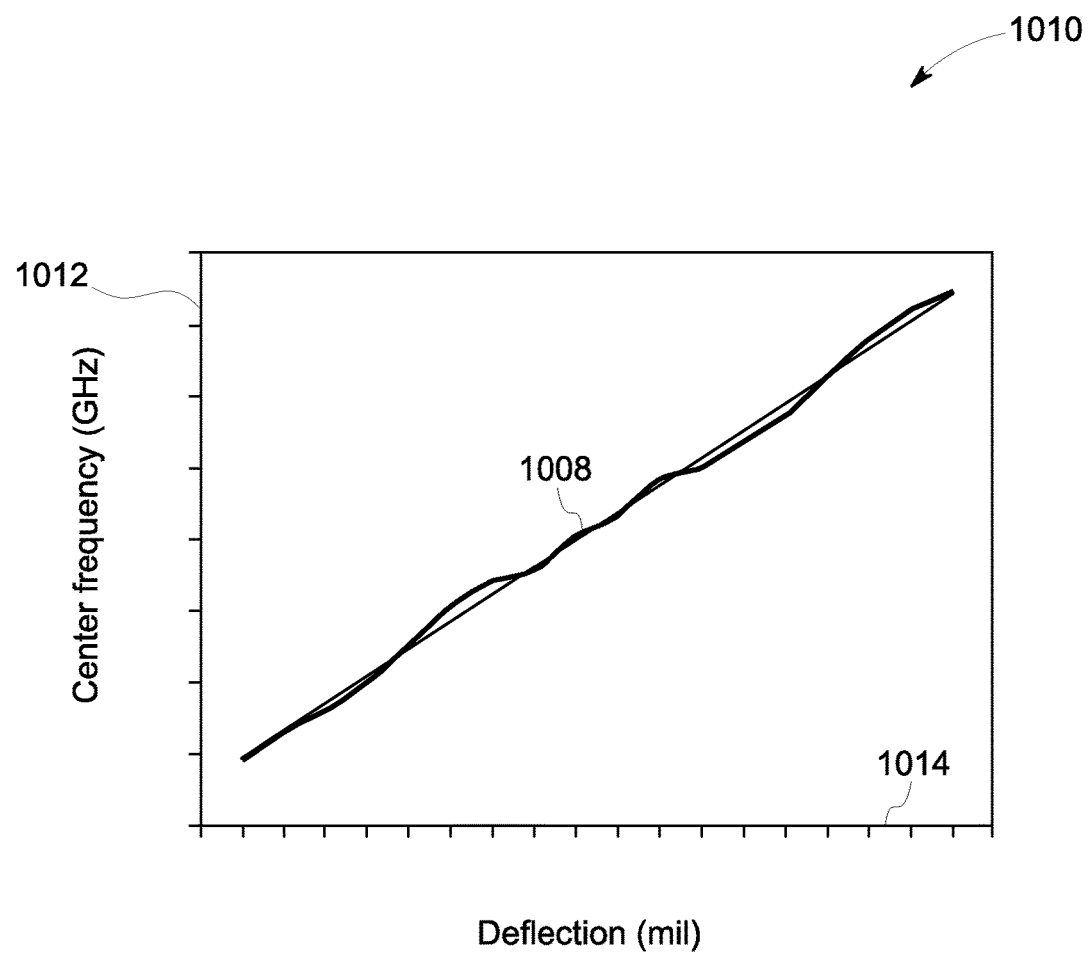
FIG. 10B is a graphical representation of the change in a sensor response with respect to the varying deflection values of the diaphragm, in accordance with aspects of the present specification.

FIGS. 10A-10B are graphical representations of a change in a center frequency of a sensor response with respect to a change in an amount of deflection of diaphragm of the passive wireless sensor. As a displacement of deflection of the diaphragm changes, a return loss or the sensor response of the antenna changes. Consequently, in the illustrated embodiment, it may be noted that the center frequency at each deflection displays linearity with respect to a change in deflection of the diaphragm.

Curves 1002 of the graph 1000 represent linearity in a relation between return loss, i.e., loss in the interrogation signals (ordinate 1004) and a frequency (abscissa 1006) of the response signals. This linearity in the relationship between the interrogation signals and the frequency of the response signals is illustrated as a curve 1008 of the graph 1010, where the graph is formed between a center frequency (ordinate 1012) for response signals for a particular set of interrogation signals and an amount of deflection (ordinate 1014) of the diaphragm.

FIG. 11 is a graphical representation 1100 of an amount of return loss (abscissa 1102) of a diaphragm of a passive wireless sensor and a frequency (ordinate 1104) of a sensor response signal transmitted by an antenna of a passive wireless sensor. Further, the passive wireless sensor may be operatively coupled to a device. A graph 1106 illustrates a sensor response when the diaphragm undergoes physical impairment. By way of example, as illustrated, graphs 1108, 1110, 1112 and 1114 illustrate sensor responses with respect to different amounts of deflection of the diaphragm. Additionally, the graph 1106 represents the response of the compromised diaphragm. As illustrated by the graph 1106, the sensor response of the compromised diaphragm may occur in a substantially lower frequency range, thereby indicating non-uniformity (e.g., physical damage) of the diaphragm. Once the physical damage is identified either manually or using a monitoring device or an output device, suitable corrective measures may be taken. For example, another passive wireless sensor may be operatively coupled to the device.

FIGS. 12-13 illustrate a comparative study of an effect of a distance (D) 1201 between a transmitter/interrogator and a passive wireless sensor. In the illustrated embodiment of FIG. 12, the interrogator 1202 is disposed at a distance 1201 of about 50 cm from an antenna of the passive wireless sensor 1204. Graphical representations 1206 and 1216 illustrate changes in sensor response (abscissa 1208) with respect to varying deflections (ordinate 1210) of a diaphragm of the passive wireless sensor. With respect to FIG. 13, where a distance 1214 between the interrogator 1202 and the antenna of the passive wireless sensor 1204 is about 5 meters, the change in sensor response with respect to the change in deflection of the diaphragm is still detectable. Accordingly, the passive wireless sensor of the present specification is configured to operate at different distances between the interrogator and the passive wireless sensor. In particular, the distance between the interrogator and the passive wireless sensor does not adversely affect the sensing capabilities of the passive wireless sensor.

Advantageously, the passive wireless sensor of the present specification is easy to install. By way of example, the passive wireless sensor may be simply adhered to a surface of a device, such as a gas turbine using adhesives. Further, the passive wireless sensor has a small footprint, mechanical volume and weight, hence, the passive wireless sensor does not interfere with the regular functioning of the device. Moreover, the passive wireless sensor is capable of effectively operating in harsh operating conditions, such as, but not limited to, high temperatures, high pressures, vibrations, or combinations thereof.

In addition, the passive wireless sensor is economically viable. Moreover, the supporting components (for example, the transmitter, the receiver and/or the interrogator) that enable the functioning of the passive wireless sensor may be disposed outside the device or systems in which the passive wireless sensor is disposed. Additionally, installation of the passive wireless sensor is convenient and time efficient. Further, the passive wireless sensor may be installed and operated without hindering the operation of the device for short durations or for an extended period of time.

Further, since the passive wireless sensor is a wireless device, the passive wireless sensor is easy to install or operatively couple to a device of interest. In addition, the passive wireless sensor is inexpensive and may be batch manufactured.

Although specific features of various embodiments of the present system may be shown in and/or described with respect to some drawings and not in others, this is for convenience only. It is to be understood that the described features, structures, and/or characteristics may be combined and/or used interchangeably in any suitable manner in the various embodiments, for example, to sense one or more physical or ambient properties of the device.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A passive wireless sensor, comprising:
   a plurality of dielectric layers;
   an antenna disposed in at least a portion of a cavity formed by one or more dielectric layers of the plurality of dielectric layers;
   a diaphragm disposed on the cavity such that the diaphragm is physically separated from the antenna; and
   a feeding element disposed in at least a portion of one of the plurality of dielectric layers between the antenna and a reference layer, thereby forming a capacitive coupling between the antenna and the reference layer, wherein the diaphragm, the antenna and the reference layer form an electronic circuit such that antenna senses a change in an operating condition of the sensor and transmits a response signal representative of the change in the operating condition of the sensor.

2. The passive wireless sensor of claim 1, further comprising one or more impedance elements disposed on or in one or more dielectric layers of the plurality of dielectric layers.

3. The passive wireless sensor of claim 1, wherein one or more dielectric layers of the plurality of dielectric layers comprise fused silica, engineered glass, silicon nitride, aluminum nitride, alumina, a ceramic composite, or combinations thereof.

4. The passive wireless sensor of claim 1, further comprising a feeding via configured to operatively couple at least a portion of the feeding element to the antenna.

5. The passive wireless sensor of claim 1, further comprising an antenna cover disposed on at least a portion of the antenna.

6. The passive wireless sensor of claim 1, wherein at least one dielectric layer of the plurality of dielectric layers comprises a material that is different from a material of other layers of the plurality of dielectric layers.

7. The passive wireless sensor of claim 1, wherein the feeding element is configured to receive interrogation signals, and wherein the feeding element is not in direct physical contact with the antenna.

8. The passive wireless sensor of claim 1, wherein the feeding element is disposed between two dielectric layers of the plurality of dielectric layers.

9. The passive wireless sensor of claim 1, wherein the antenna comprises a continuous layer, a patterned layer, a plurality of patterned structures, or combinations thereof.

10. The passive wireless sensor of claim 1, further comprising a protection layer disposed on the diaphragm.

11. The passive wireless sensor of claim 10, wherein the protection layer comprises silicon oxide, silicon nitride, alumina, aluminum nitride, spin on glass, a ceramic composite, or combinations thereof.

12. The passive wireless sensor of claim 1, wherein the diaphragm comprises an electrically conductive material.

13. The passive wireless sensor of claim 1, wherein the antenna comprises an electrically conductive material.

14. The passive wireless sensor of claim 1, wherein one or more dielectric layers of the plurality of dielectric layers comprise a plurality of columns.

15. The passive wireless sensor of claim 14, further comprising a feeding via configured to operatively couple at least a portion of the feeding element to the antenna, wherein the feeding via is disposed between two or more columns of the plurality of columns.

16. A monitoring system, comprising:
a device comprising a first surface; and
a passive wireless sensor coupled to the first surface of the device, wherein the passive wireless sensor comprises:
a plurality of dielectric layers;
an antenna disposed in at least a portion of a cavity formed by one or more dielectric layers of the plurality of dielectric layers;
a diaphragm disposed on the cavity such that the diaphragm is physically separated from the antenna;
a feeding element disposed in at least a portion of one of the plurality of dielectric layers between the antenna and a reference layer, thereby forming a capacitive coupling between the antenna and the reference layer, wherein the diaphragm, the antenna and the reference layer form an electronic circuit such that antenna senses a change in an operating condition of the sensor and transmits a response signal representative of the change in the operating condition of the sensor;
a receiver operatively coupled to the passive wireless sensor and configured to receive at least a portion of response signals representative of the sensor response from the passive wireless sensor;
a signal processor operatively coupled to the receiver and configured to process the response signals; and
a monitoring device operatively coupled to the signal processor and configured to monitor the passive wireless sensor based on the processed response signals.

17. The monitoring system of claim 16, wherein the device comprises a turbine engine, an internal combustion engine, a turbine blade, a reactor, or combinations thereof.

18. A sensor network, comprising:
a transmitter configured to transmit interrogation signals;
a plurality of sensing nodes, wherein one or more sensing nodes of the plurality of sensing nodes comprise at least one passive wireless sensor, wherein the at least one passive wireless sensor is configured to receive the interrogation signals and transmit response signals in response to the interrogation signals, and wherein the at least one passive wireless sensor comprises:
a plurality of dielectric layers;
an antenna disposed in at least a portion of a cavity formed by one or more dielectric layers of the plurality of dielectric layers;
a diaphragm disposed on the cavity such that the diaphragm is physically separated from the antenna;
a feeding element disposed in at least a portion of one of the plurality of dielectric layers between the antenna and a reference layer, thereby forming a capacitive coupling between the antenna and the reference layer, wherein the diaphragm, the antenna and the reference layer form an electronic circuit such that antenna senses a change in an operating condition of the sensor and transmits a response signal representative of the change in operating condition of the sensor;
a receiver operatively coupled to the passive wireless sensor and configured to receive the response signal; and
a signal processor operatively coupled to the receiver and configured to process the response signal to produce a sensor response.

19. The sensor network of claim 18, wherein the feeding element is not in direct physical contact with the antenna.

* * * * *